US012041742B2

(12) United States Patent
Tsorng et al.

(10) Patent No.: US 12,041,742 B2
(45) Date of Patent: Jul. 16, 2024

(54) SYSTEM AND METHOD FOR SIMULATING CABLE ROUTING BETWEEN ELECTRONIC COMPONENTS WITHIN A COMPUTER CHASSIS

(71) Applicant: QUANTA COMPUTER INC., Taoyuan (TW)

(72) Inventors: Yaw-Tzorng Tsorng, Taoyuan (TW); Chen-Chien Kuo, Taoyuan (TW); Chen Tseng, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 938 days.

(21) Appl. No.: 17/073,557

(22) Filed: Oct. 19, 2020

(65) Prior Publication Data

US 2022/0124930 A1 Apr. 21, 2022

(51) Int. Cl.
*H05K 7/02* (2006.01)
*G01R 31/58* (2020.01)
(Continued)

(52) U.S. Cl.
CPC ............. *H05K 7/026* (2013.01); *G01R 31/58* (2020.01); *G06F 1/183* (2013.01); *G06F 30/394* (2020.01);
(Continued)

(58) Field of Classification Search
CPC .... G06F 30/394; G06F 2113/16; G06F 1/183; Y10T 29/53217; Y10T 29/53243; H01R 43/205; H05K 1/0287; H05K 1/0289; H05K 7/026; H05K 7/04; H02G 1/06; G01R 31/58
See application file for complete search history.

(56) References Cited

U.S. PATENT DOCUMENTS

2011/0205718 A1* 8/2011 Rosenberg .............. G06F 1/183
361/752

FOREIGN PATENT DOCUMENTS

JP 11298182 A * 10/1999
JP 2000114793 A * 4/2000
(Continued)

OTHER PUBLICATIONS

Galassi et al, "Robotic Wires Manipulation for Switchgear Cabling and Wiring Harness Manufacturing," 2021 4th IEEE International Conference on Industrial Cyber-Physical Systems (ICPS), Victoria, BC, Canada, 2021, pp. 531-536. (Year: 2021).*
(Continued)

*Primary Examiner* — A. Dexter Tugbang
(74) *Attorney, Agent, or Firm* — NIXON PEABODY LLP

(57) ABSTRACT

An apparatus simulates cable routing for determining signal integrity between electronic components within a computer chassis. The apparatus includes a base plate simulating a computer chassis base. The base plate includes a top surface. The apparatus further includes a plurality of reconfigurable mounting fixtures, each allowing temporary mounting of a printed circuit board assembly (PCBA) to a respective reconfigurable mounting fixture. Each of the plurality of reconfigurable mounting fixtures is temporarily mountable anywhere on the top surface of the base plate. The apparatus further includes a cable having a first end connector that allows a connection to a first PCBA, and a second end connector that allows a connection to a second PCBA.

11 Claims, 4 Drawing Sheets

(51) Int. Cl.

| | |
|---|---|
| ***G06F 1/18*** | (2006.01) |
| ***G06F 30/394*** | (2020.01) |
| ***H02G 1/06*** | (2006.01) |
| ***H05K 7/04*** | (2006.01) |
| *G06F 113/16* | (2020.01) |
| *H05K 1/02* | (2006.01) |

(52) U.S. Cl.
CPC ................. *H02G 1/06* (2013.01); *H05K 7/04* (2013.01); *G06F 2113/16* (2020.01); *H05K 1/0287* (2013.01); *H05K 1/0289* (2013.01); *Y10T 29/53217* (2015.01); *Y10T 29/53243* (2015.01)

(56) References Cited

FOREIGN PATENT DOCUMENTS

| | | | | |
|---|---|---|---|---|
| JP | 2002354053 A | * 12/2002 | | |
| JP | 2003282201 A | * 10/2003 | | |
| JP | 2014007315 A | * 1/2014 | ........... | H01L 21/568 |

OTHER PUBLICATIONS

Machine Translation of Japanese Patent Publication, JP 11-298182, Dec. 2023. (Year: 2023).*
Machine Translation of Japanese Patent Publication, JP 2003-282201, Dec. 2023. (Year: 2023).*
Machine Translation of Japanese Patent Publication, JP 2000-114793, Dec. 2023. (Year: 2023).*
Machine Translation of Japanese Patent Publication, JP 2014-7315, Dec. 2023. (Year: 2023).*
Machine Translation of Japanese Patent Publication, JP 2002-354053, Dec. 2023 (Year: 2023).*

* cited by examiner

SYSTEM AND METHOD FOR SIMULATING CABLE ROUTING BETWEEN ELECTRONIC COMPONENTS WITHIN A COMPUTER CHASSIS

FIELD OF THE INVENTION

The present invention relates to cable routing within a computer chassis. More specifically, the present invention relates to systems and methods for determining cable routing between electronic components within a computer chassis.

BACKGROUND

The interior of a computer chassis includes many electrical and mechanical components, such as a motherboard, central processing unit, storage device, memory card, video card, sound card, network card, expansion card, fan module, power supply, and other components. Many of the components are electrically connected by cables routed within the computer chassis. The cables within the chassis are typically routed around other electrical and mechanical components.

A computer chassis has a finite interior space for housing all the electrical and mechanical components. Building a computer system within the limited space of a computer chassis is complicated by determining the cable routing between components. Accordingly, there is a need for increasing the efficiency in determining the routing of cables between components within a computer chassis.

SUMMARY

According to one embodiment, an apparatus simulates cable routing for determining signal integrity between electronic components within a computer chassis. The apparatus includes a base plate simulating a computer chassis base. The base plate includes a top surface. A plurality of reconfigurable mounting fixtures each allow temporary mounting of a printed circuit board assembly (PCBA) to a respective reconfigurable mounting fixture. The plurality of reconfigurable mounting fixtures are temporarily mountable anywhere on the top surface of the base plate. A cable including a first end connector allows a connection to a first PCBA, and a second end connector allows a connection to a second PCBA.

In a further aspect of the embodiment, the first PCBA is temporarily mounted to a first of the plurality of reconfigurable mounting fixtures, and the second PCBA is temporarily mounted to a second of the plurality of reconfigurable mounting fixtures. The first PCBA and the second PCBA are temporarily mounted before being removed and mounted inside a computer chassis.

In yet a further aspect of the embodiment, at least one of the plurality of reconfigurable mounting fixtures includes a plurality of perforations for receiving removable pins for temporarily mounting the PCBA. The perforations penetrate a surface of the at least one reconfigurable mounting fixture. In another aspect of the embodiment, the at least one reconfigurable mounting fixture includes a rectangular-shaped mounting surface. The plurality of perforations is arranged in a matrix on the rectangular-shaped mounting surface.

In a further aspect of the embodiment, at least one of the plurality of reconfigurable mounting fixtures comprises two distinct panels with one panel being mounted perpendicular to the other panel. In another aspect of the embodiment, the other panel is mounted parallel to the top surface. In yet another aspect of the embodiment, the first PCBA is temporarily mounted to the other panel. In yet another aspect, the two distinct panels include side walls where at least one of the side walls includes a plurality of holes for receiving removable pins to mount the one panel to the other panel. In another aspect of the embodiment, the one panel includes a plurality of perforations that penetrate a surface of the one panel where the perforations receive removable pins for temporarily mounting the first PCBA to the one panel.

In a further aspect of the embodiment, the plurality of reconfigurable mounting fixtures is temporarily mounted to the top surface with a sticky adhesive. In another aspect of the embodiment, the base plate is a ferromagnetic metal. At least one of the reconfigurable mounting fixtures is temporarily mounted to the top surface by a magnetic attraction between a metal portion on a bottom surface of the at least one reconfigurable mounting fixture and the base plate.

In a further aspect of the embodiment, the cable is a high-speed cable. In yet another aspect of the embodiment, the cable is supported by the top surface and includes at least two bends between the first end connector and the second end connector.

According to another embodiment, a method simulates cable routing for determining signal integrity between electronic components within a computer chassis. The method includes mounting a first PCBA in a first position on a first reconfigurable mounting fixture mountable anywhere on a continuous top surface of a base plate that simulates a computer chassis base, second PCBA is mounted in a second position on a second reconfigurable mounting fixture mountable anywhere on the continuous top surface. The first reconfigurable mounting fixture is mounted at a first location on the continuous top surface. The second reconfigurable mounting fixture is mounted at a second location on the continuous top surface. The first PCBA is connected to the second PCBA with a cable routed on the continuous top surface between a first connector for the first PCBA and a second connector for the second PCBA. A first signal integrity value of the cable between the first connector and the second connector is determined.

A further aspect of the embodiment includes mounting the first reconfigurable mounting fixture at a third location on the continuous top surface. The third location is different from the first location and the second location. A second signal integrity value of the cable between the first connector and the second connector is determined. The second signal integrity value is different from the first signal integrity value. In another aspect of the embodiment, the cable routing for determining the first signal integrity value includes three bends in the cable, and the cable routing for determining the second signal integrity value includes two bends in the cable.

In a further aspect of the embodiment, the first PCBA is mounted in a third position on the first reconfigurable mounting fixture. A second signal integrity value of the cable between the fast connector and the second connector is determined. The second signal integrity value is different from the first signal integrity value.

In a further aspect of the embodiment, a third PCBA is mounted in a third position on a third reconfigurable mounting fixture mountable anywhere on the continuous top surface. The third reconfigurable mounting fixture is mounted at a third location on the continuous top surface. The second PCBA is connected to the third PCBA with a second cable routed on the base plate between the second connector for the second PCBA and a third connector for the third PCBA. A second signal integrity value of the second cable between the second connector and the third connector is determined.

In a further aspect of the embodiment, the first reconfigurable mounting fixture and the second reconfigurable mounting fixture are temporarily mounted to the continuous top surface with a sticky adhesive. In another aspect of the embodiment, the first reconfigurable mounting fixture and the second reconfigurable mounting fixture each include a plurality of perforations arranged in a matrix on a rectangular-shaped mounting surface for receiving pins for mounting the PCBA. The perforations penetrate the respective mounting surfaces of the first reconfigurable mounting fixture and the second reconfigurable mounting fixture.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims.

BRIEF DESCRIPTION OF THE DRAWINGS

The disclosure will be better understood from the following description of embodiments together with reference to the accompanying drawings.

Figure 1:
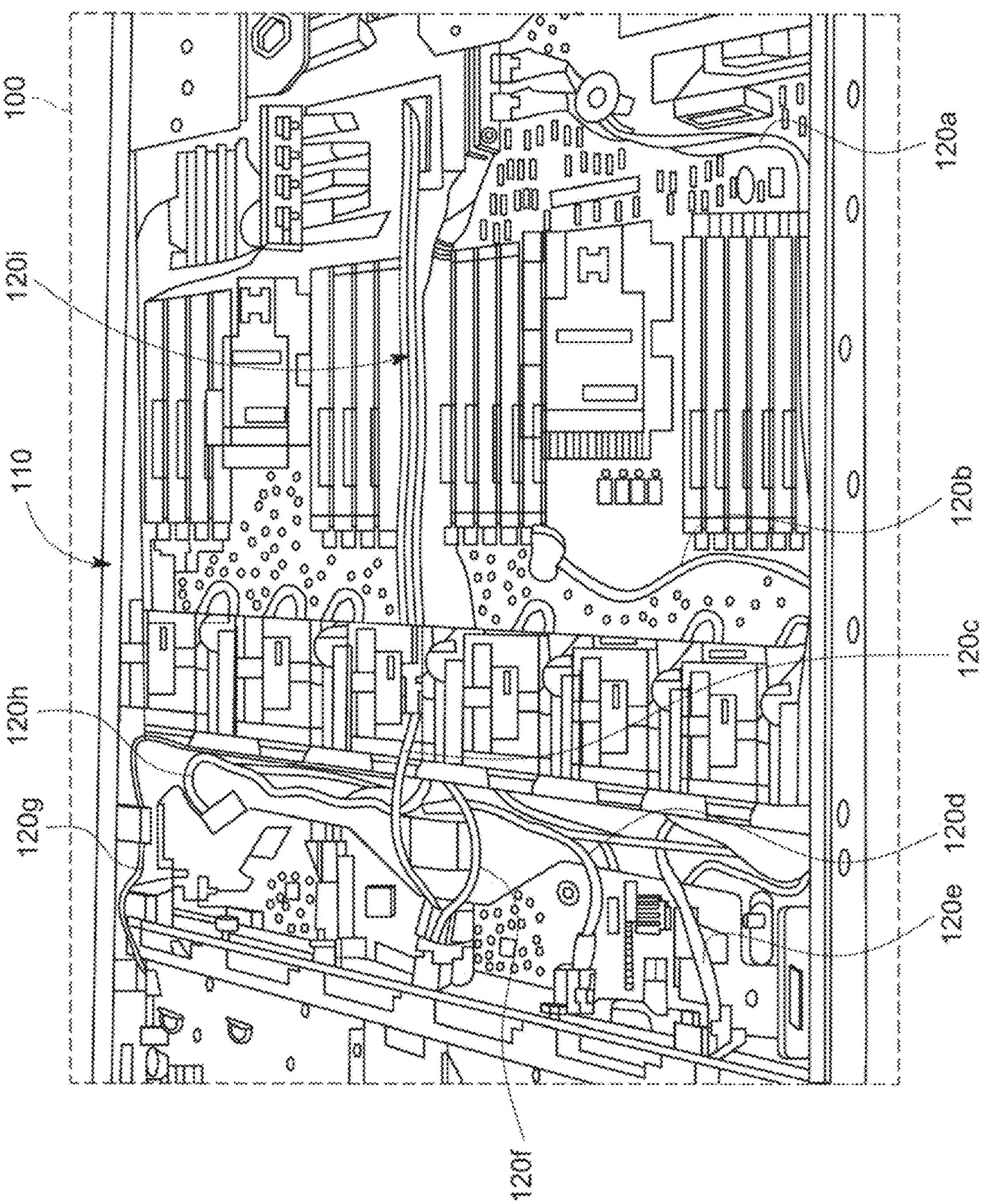
FIG. 1 is a partial perspective view of an interior of a computer chassis, according to some implementations of the present disclosure.

The present disclosure is susceptible to various modifications and alternative forms. Some representative embodiments have been shown by way of example in the drawings and will be described in detail herein. It should be understood, however, that the invention is not intended to be limited to the particular forms disclosed. Rather, the disclosure is to cover all modifications, equivalents, and alternatives falling within the spirit and scope of the invention as defined by the appended claims.

DETAILED DESCRIPTION

The various embodiments are described with reference to the attached figures, where like reference numerals are used throughout the figures to designate similar or equivalent elements. The figures are not drawn to scale, and they are provided merely to illustrate the instant invention. It should be understood that numerous specific details, relationships, and methods are set forth to provide a full understanding. One having ordinary skill in the relevant art, however, will readily recognize that the various embodiments can be practiced without one or more of the specific details, or with other methods. In other instances, well-known structures or operations are not shown in detail to avoid obscuring certain aspects of the various embodiments. The various embodiments are not limited by the illustrated ordering of acts or events, as some acts may occur in different orders and/or concurrently with other acts or events. Furthermore, not all illustrated acts or events required to implement a methodology in accordance with the present invention.

Elements and limitations that are disclosed, for example, in the Abstract, Summary, and Detailed Description sections, but not explicitly set forth in the claims, should not be incorporated into the claims, singly, or collectively, by implication, inference, or otherwise. For purposes of the present detailed description, unless specifically disclaimed, the singular includes the plural and vice versa. The word "including" means "including without limitation." Moreover, words of approximation, such as "about," "almost," "substantially," "approximately," and the like, can be used herein to mean "at,", "near," or "nearly at," or "within 3-5% of," or "within acceptable manufacturing tolerances," or any logical combination thereof, for example.

With regards to the present disclosure, the terms "computer system" or "computer device" refer to any electronically-powered or battery-powered equipment that has hardware, software, and/or firmware components, where the software and or firmware components can be configured, for operating features on the device.

A chassis for a computer device has finite interior space for housing electrical and mechanical components. Building a computer device within the limited space of a computer chassis is complicated by the determination of cable routing between components. For example, cables need to be routed around the numerous electronic and mechanical components within the computer chassis, which increases the difficulty of determining a cable layout that minimizes degradation of signal integrity in the cables. Rather than determining cable routing within an assembled computer system, the present disclosure contemplates increasing the efficiency in determining the routing of cables between components using an apparatus that simulates a chassis to determine a preferred cable routing. Benefits of the present apparatus and method include an efficient set-up of reconfigurable mounting fixtures for simulating computer components. Furthermore, the reconfigurable mounting fixtures are scalable and flexible by allowing changes in cable length, connector location, and connector orientation to be readily, in addition, the reconfigurable mounting fixtures allow simulation of cable routing that can be duplicated within a computer device that provides an efficient way to obtain precise signal integrity data to verify a layout allows the computer device to operate within design specifications.

Simulation of the cable routing allows signal integrity between the various computer components to be assessed to allow for improved or optimized cable configurations within the computer chassis. The present apparatus and method allows a technician to simulate a cable layout and optimize that layout between two or more components. In the simulation, the technician can account for signal noise or signal loss in a cable extending between components before the cables are installed in the computer chassis. For example, signal noise or signal loss may degrade in a cable connecting two components of a computer device by about 3 percent to 6 percent for every bend or significant curve in a cable between two components. The present disclosure allows for simulation of the cable layout, including bends in the cable, so that signal loss or signal noise can be determined and minimized through possible alternate layouts or the use of different cables. The final simulated cable layout can then be duplicated during assembly of an actual computer device.

Turning now to FIG. 1, a partial perspective view is depicted of an interior space 110 of computer chassis 100 for an assembled computer device. The interior space 110 includes a number of exemplary cables 120*a*, 120*b*, 120*c*, 120*d*, 120*e*, 120*f*, 120*g*, 120*h*, 120*i* routed between various electronic and mechanical components within the computer chassis 100. The cables 120*a*-120*i* are of different lengths and can have a varying number of bends or curves as the cables 120*a*-120*i* are routed between components. FIG. 1 further depicts the complexity of the interior space 110 of an assembled computer device. This complexity complicates the ability to determine signal integrity in the various cables 120*a*-120*i*. The present disclosure contemplates providing an efficient system for testing signal integrity in cables, such as cables 120*a*-120*i*, that duplicates or simulates an actual cable routing but outside of an actual computer chassis. Simulated cable routing and related signal integrity testing contemplated by the present disclosure can include assessing many different types of computer component cables, such as HD mini-SAS, mini-SAS, PCIe, SlimSAS™, MCIO, and other types of cables including high-speed cables.

Figure 2A:
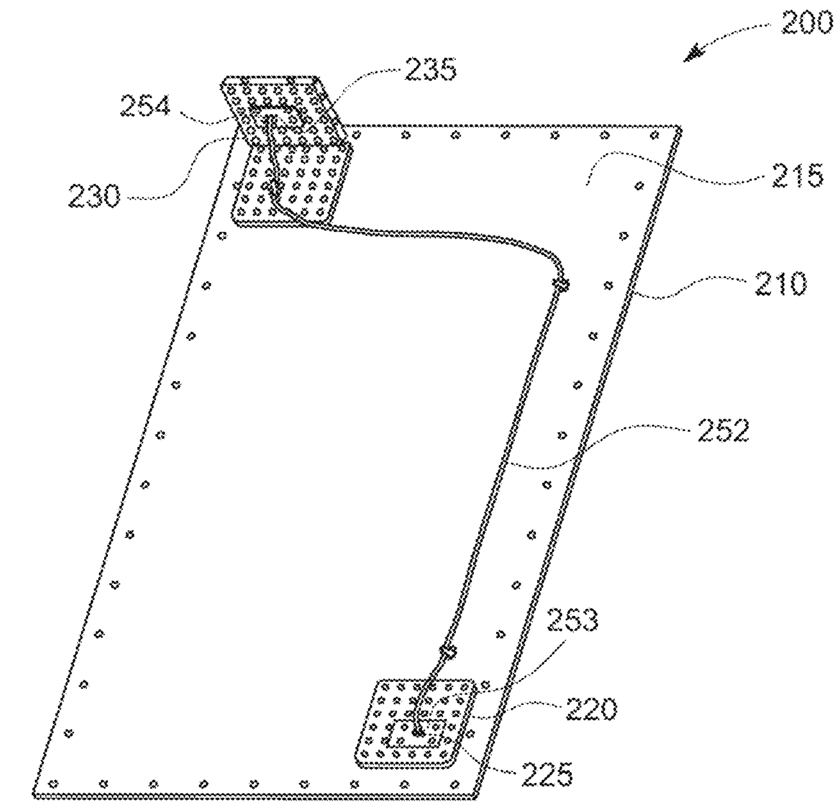
FIGS. 2A-2C are perspective views of different aspects of an apparatus for simulating cable routing between electronic components within a computer chassis, according to some implementations of the present disclosure.
Figure 2B:
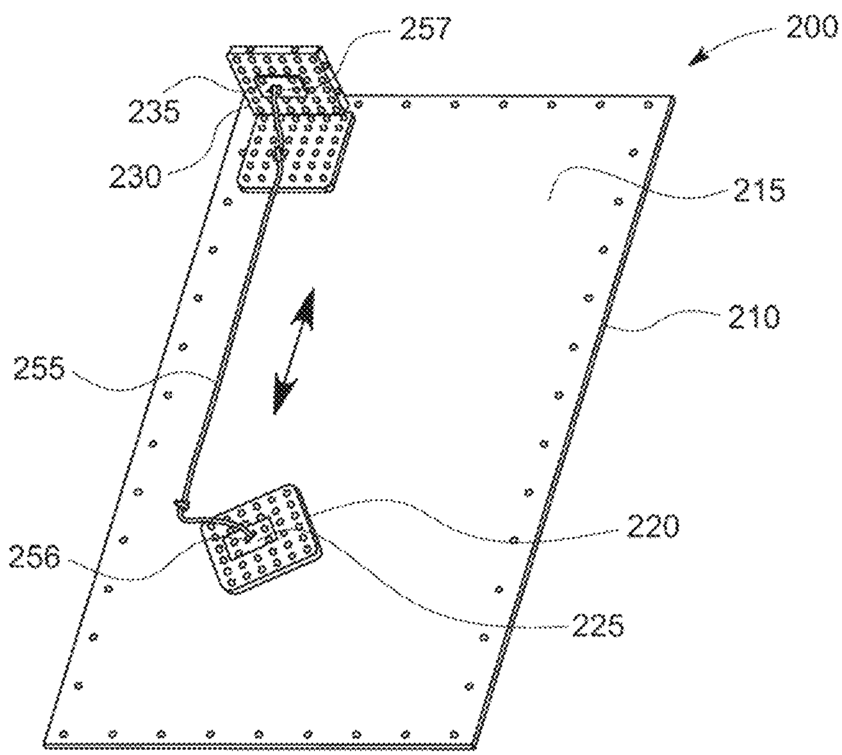
Figure 2C:
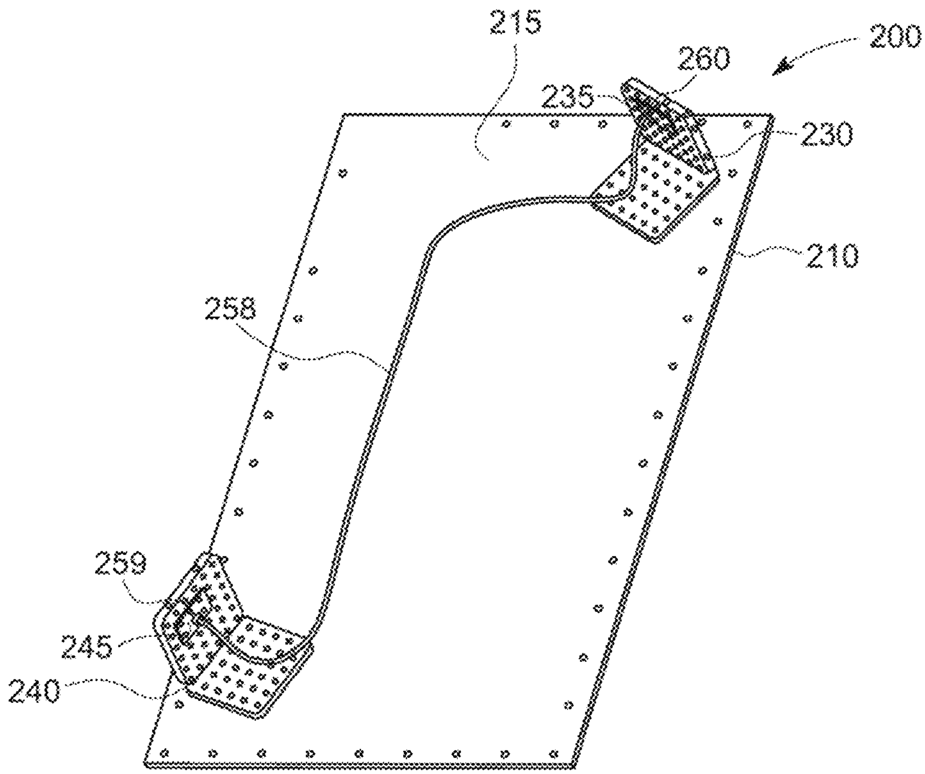

Turning to FIGS. 2A-2C, perspective views are depicted of an apparatus 200 for simulating cable routing between components within a computer chassis. The apparatus includes a base plate 210 that simulates a base of a computer chassis. The base plate 210 can include a top surface 215 that in some implementations may be a continuous surface. Two or more reconfigurable mounting fixtures, such as fixtures 220, 230, 240, are depicted where each includes a temporarily mounted printed circuit board assembly ("PCBA"), such as PCBAs 225, 135, 245.

Referring to FIG. 2A, a cable 252 has a predetermined length based on an actual cable length planned for an assembled computer device. The cable 252 extends between a first PCBA component 225 and a second PCBA component 235, and includes a first connector 253 connected to the first PCBA 225 and a second connector 254 connected to the second PCBA 235. The first reconfigurable mounting fixture 220 is temporarily mounted in a first position, and the second reconfigurable mounting fixture 230 is temporarily mounted at a second position, both on the top surface 215 of the base plate 210. The cable 252 is routed along the top surface 215 of the base plate 210 between the two reconfigurable mounting fixtures 220, 230 to the respective PCBAs 225, 235 mounted to the reconfigurable mounting fixtures 220, 230. The base plate 210 is sized to simulate the base of an actual computer chassis, and the two reconfigurable mounting fixtures 220, 230 are positioned at the planned locations of components, such as PCBAs 225, 235, within an actual assembled computer device. The components can further be oriented on the reconfigurable mounting fixtures 220, 230 in the same orientation planned within the actual assembled computer device. Signal integrity testing can then be performed by a technician between the first connector 253 and the second connector 254 of the routed cable 252 to determine if any signal loss or signal noise in the cable due to bends, or other cable distortions, between the two components disposed on the reconfigurable mounting fixtures 220, 230 is within acceptable ranges. The routing of the cable 252 is contemplated to duplicate the routing planned for the actual assembled computer device. If the signal integrity in the cable 252 between the first connector 253 and the second connector 254 is not acceptable, the routing of the cable 252, the mounting of the reconfigurable mounting fixtures 220, 230, and the mounting of components (e.g., PCBAs 225, 235) to the reconfigurable mounting fixtures 220, 230 can be adjusted to a new configuration and retested for signal integrity.

Referring to FIG. 2B, a cable 255 is depicted that is shorter than cable 252 in FIG. 2A. Cable 255 extends between first and second PCBA components 225, 235 and includes a first connector 256 connected to the first PCBA 225, and a second connector 257 connected to the second PCBA 235. The first reconfigurable mounting fixture 220 in FIG. 213 has been relocated to a new temporary position from the first position depicted in FIG. 2A. The second reconfigurable mounting fixture 230 continues to be temporarily mounted at the second position on top surface 215 of the base plate 210. Cable 255 is shorter than cable 252 (see FIG. 2A) and is routed along the top surface 215 of the base plate 210 between the two reconfigurable mounting fixtures 220, 230 to the respective PCBAs 225, 235. The layout of cable 255 eliminates at least one bend or distortion in comparison to cable 252. The two reconfigurable mounting fixtures 220, 230 are also positioned in a new configuration based on new planned locations of components, such as PCBAs 225, 235, that are better expected to meet desired signal integrity values for the computer device. Signal integrity testing can then be performed by a technician between the first connector 256 and the second connector 257 of the routed cable 255 to determine if any signal loss or signal noise in the cable due to bends, or other cable distortions, between the two components disposed on the reconfigurable mounting fixtures is within acceptable ranges. If the signal integrity in the cable 255 between the first connector 256 and the second connector 257 is not acceptable, the routing of the cable 255, the mounting of the reconfigurable mounting fixtures 220, 230, and the mounting of components (e.g., PCBAs 225, 235) to the reconfigurable mounting fixtures 220, 230 can be adjusted to a new configuration and further retested for signal integrity.

Referring to FIG. 2C, a cable 258 is depicted that is longer than cable 255 (see FIG. 2B) and that is a similar length to cable 252 (see FIG. 2A). Cable 258 extends between first and second PCBA components 245, 235, and includes a first connector 259 connected to a first PCBA 245 and a second connector 260 connected to the second PCBA 235. The first and second PCBA components 245, 235 are respectively mounted to a first reconfigurable mounting fixture 240 and a second reconfigurable mounting fixture 230. The second reconfigurable mounting fixture 230 has been relocated from the temporary mounting at the second position depicted in FIGS. 2A and 2B to a new temporary mounting in a new position depicted in FIG. 2C. The first reconfigurable mounting fixture 240 has been reconfigured from the first reconfigurable mounting fixture 220 depicted in FIGS. 2A and 2B to allow for a different orientation of the PCBA component 245. In FIGS. 2A and 2B, the PCBA component 225 is mounted parallel to the top surface 215 of base plate 210. In FIG. 2C, the PCBA component 245 is mounted in a different orientation that is perpendicular to the top surface 215 of base plate 210. Cable 258 is routed along the top surface 215 of the base plate 210 between the two reconfigurable mounting fixtures 240, 230 and to the respective PCBAs 245, 235. The layout adds one bend or distortion relative to cable 252 in the layout of FIG. 2A and two bends or distortions relative to cable 255 in the cable layout of FIG. 2B. The two reconfigurable mounting fixtures 240, 230 are positioned in a new configuration based on new planned locations of components, such as PCBAs 245, 235, within an actual assembled computer device that may better meet desired signal integrity values for the computer device. In some aspects, reorienting the component from a parallel to a perpendicular position relative to the top surface 215 of the base plate 210 can improve signal integrity. Signal integrity testing can then be performed by a technician between the first connector 259 and the second connector 260 of the routed cable 258 to determine if any signal loss or signal noise in the cable component orientation and due to bends, or other cable distortions, between the two components is within acceptable ranges. If the signal integrity in the cable 258 between the first connector 259 and the second connector 260 is not acceptable, the routing of the cable 258, the mounting of reconfigurable mounting fixtures 240, 230, and the mounting of components (e.g., PCBAs 245, 235) to the reconfigurable mounting fixtures 240, 230 can be adjusted again to a new configuration and further retested for signal integrity.

In some implementations, the reconfigurable mounting fixtures, such as fixtures 220 (see FIGS. 2A and 2B), 230, 240, are temporarily mounted to the top surface 215 of the base plate 210 with a sticky adhesive that allows the reconfigurable mounting fixtures to be easily secured and removed. In some implementations, the base plate 210 is a ferromagnetic metal such that one or more of the reconfigurable mounting fixtures, such as fixtures 220, 230, 240, are temporarily mounted to the top surface 215 by a magnetic attraction between the base plate 210 and a metal portion on a bottom surface of one or more of the reconfigurable mounting fixtures or a metal portion within one or more of the reconfigurable mounting fixtures.

Figure 3:
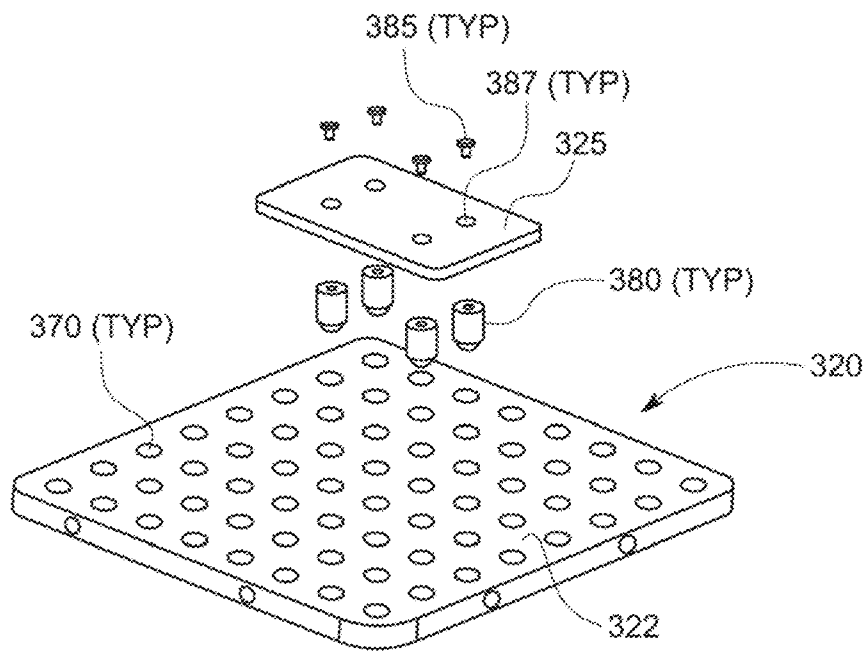
FIG. 3 is an exploded perspective view of a printed circuit board assembly mounted to a reconfigurable mounting fixture, according to some implementations of the present disclosure.

Turning to FIG. 3, an exploded perspective view is depicted of a PCBA 325 mounted to a single panel reconfigurable mounting fixture 320. Reconfigurable mounting fixtures, such as single panel fixture 320 or fixtures 220, 230, 240 (see FIGS. 2A-2C), include a plurality of perforations 370 on a mounting surface 322 for receiving removable pins 380 to temporarily mount a PCBA, or other components that may be connected with the computer chassis using cables. The removable pins 380 may be secured to the PCBA 325 with screws 385, or other fastening devices that extend through holes 387 of the PCBA 325, that engage the removable pins 380. The holes 387 in the PCBA 325 have a similar spacing to the perforations 370.

With the pins 380 secured to the PCBA 325, each of the pins 380 can be further be inserted into respective ones of the perforations 370 via a friction fit or with a sticky or tacky adhesive that allows the PC BA 325 to be easily removed when needed. The perforations 370 penetrate a mounting surface 322 of the reconfigurable mounting fixtures, such as single panel fixture 320. The single panel reconfigurable mounting fixture 320 includes a rectangular-shaped mounting surface 322. Other shapes for the mounting surface are contemplated, including circular and elliptical shapes, along with other polygonal shapes. The perforations 370 are depicted in a grid-like matrix on the rectangular-shaped mounting surface 322 to allow for many different PCBA configurations, or for other computer components to be temporarily mounted to the single panel reconfigurable mounting fixture 320.

Figure 4:
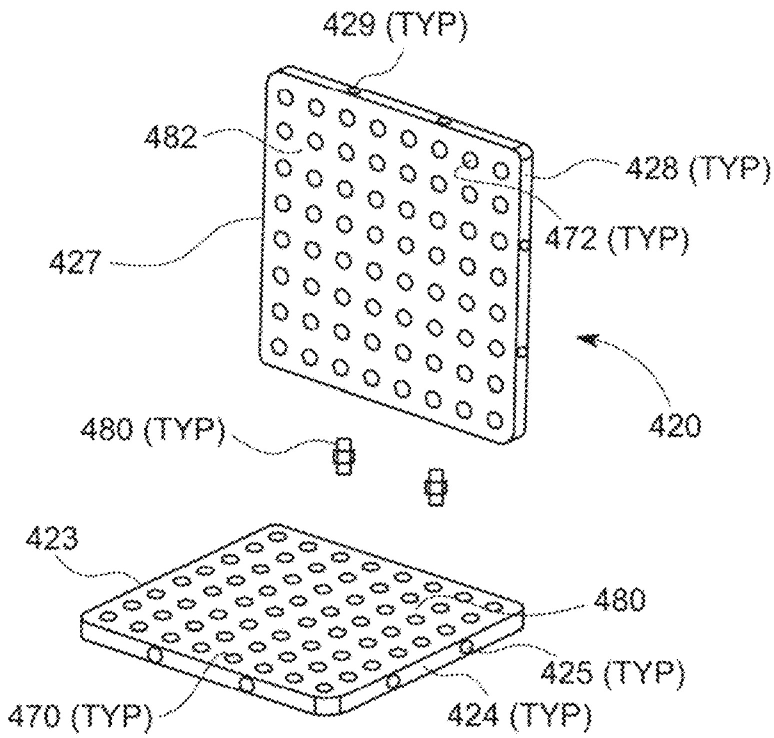
FIG. 4 is an exploded perspective view of a reconfigurable mounting fixture including two panels, according to some implementations of the present disclosure.

Turning to FIG. 4, an exploded perspective view is depicted of a reconfigurable mounting fixture 420 including a first panel 423, with a second panel 427 mounted perpendicular to the first panel 423. The first panel 423 is temporarily mountable to the top surface of the base plate, such as elements 210 and 215 in FIGS. 2A-2C, such that the first panel 423 is generally parallel to the top surface 215. The first panel 423 and the second panel 427 include respective side walls 424, 428 that extend around the perimeter of the panels 423, 427. The side walls 424, 428 can include one or more holes 425, 429. Furthermore, the first panel 423 and the second panel 427 can each include a plurality of perforations 470, 472 on respective mounting surfaces 480, 482 of the panels 423, 427. In a two panel implementation of the reconfigurable mounting fixture 420, the first panel 423 is secured or mounted to the second panel 427 using pins 480 where a first end of the pins 480 is secured into one or more holes 429 of a bottom side wall 428 of the second panel 427. The opposite end of the pins 480 is then secured into one or more of the perforations 470 of the mounting surface 480 of the first panel 423. The perforations 470 of the first panel 423 serve the dual role of allowing two panels to be temporarily secured together and for temporarily mounting a PCBA or other computer component to the first panel 423.

Figure 5:
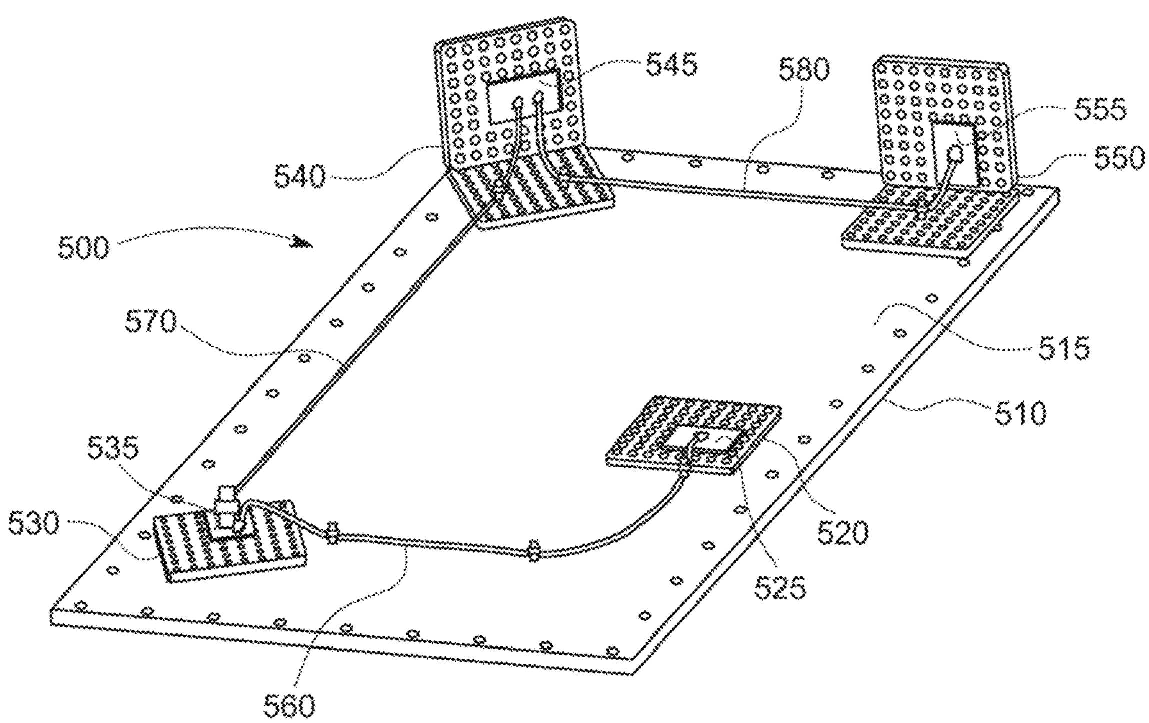
FIG. 5 is a perspective view of an apparatus with more than two reconfigurable mounting fixtures for simulating cable routing between electronic components within a computer chassis, according to some implementations of the present disclosure.

Turning to FIGS. 5, a perspective view is depicted of an apparatus 500 for simulating cable routing for maintaining signal integrity between electronic components within a computer chassis. The apparatus 500 includes multiple reconfigurable mounting fixtures temporarily mountable anywhere on a top surface 515 of a base plate 510 that simulates the base of a computer chassis. The apparatus 500 includes a first single-panel reconfigurable mounting fixture 520 temporarily mounted at a first position; a second single-panel reconfigurable mounting fixture 530 temporarily mounted at a second position; a third two-panel reconfigurable mounting fixture 540 temporarily mounted at a third position; and a fourth two-panel reconfigurable mounting fixture 550 temporarily mounted at a fourth position. Each of the reconfigurable mounting fixtures 520, 530, 540, 550 has an electronic component, such as PCBAs 525, 535, 545, 555, mounted to a panel of one of the respective reconfigurable mounting fixtures. In some implementations, some of the electronic components, such as PCBAs 525 and 535, are temporarily mounted parallel to the top surface 515 of the base plate 510. In some implementations, some of the electronic components, such as PCBAs 545 and 555, are temporarily mounted perpendicular to and at varying distances away from the top surface 515 of the base plate 510.

The electronic components are all connected by a plurality of cables that simulate a planned layout for an actual assembled computer device. For example, cable 560 connects first PCBA 525 and second PCBA 535. Cable 570 connects second PCBA 535 and third PCBA 545. Cable 580 connects third PCBA 545 and fourth PCBA 555. Each of the cables 560, 570, 580 are routed in a manner that simulates an actual cable layout between two respective electronic components connected by the cable, which typically includes the cable being disposed on the top surface 515 of the base plate 510.

The electronic components, such as PCBAs 525, 535, 545, 555 can further be oriented on the reconfigurable mounting fixtures 520, 530, 540, 550 in the same orientation planned within the actual assembled computer device. Signal integrity testing can then be performed by a technician between the connections of the routed cable with two respective PCBAs to determine signal loss or signal noise in the cable due to bends or other cable distortions between the two components is within acceptable ranges. The routing of the cables is the same as the routing planned for the actual assembled computer device. If the signal integrity in a cable between two connected components is not acceptable, the routing of the cable, the mounting, of the reconfigurable mounting fixtures, or the mounting of components to the reconfigurable mounting fixtures can be adjusted to a new configuration and retested for signal integrity.

More and fewer combinations of reconfigurable mounting fixtures, mounted electronic components, and cable layouts depicted in FIG. 5 are contemplated.

In some implementations, a method simulates cable routing for determining signal integrity between electronic components within a computer chassis. Referring to FIGS. 2A-2C for illustrative purposes, the method includes mounting a first PCBA 225 in a first position on a first reconfigurable mounting fixture 220 mountable anywhere on a continuous top surface 215 of a base plate 210 simulating a computer chassis base. A second PCBA 235 is mounted in a second position on a second reconfigurable mounting fixture 230 mountable anywhere on the continuous top surface 215. The first reconfigurable mounting fixture 220 is mounted at a first location on the continuous top surface 215. The second reconfigurable mounting fixture 230 is mounted at a second location different from the first location on the continuous top surface 215. The first PCBA 225 is connected to the second PCBA 235, with a cable 252 routed on the continuous top surface 215 between a first connector 253 for the first PCBA 225 and a second connector 254 for the second PCBA 235. A first signal integrity value of the cable 252 between the first connector 253 and the second connector 254 is then determined.

In some implementations, the first reconfigurable mounting fixture 225 is mounted at a new third location on the continuous top surface 215. The third location is different from the first location and the second location. A second signal integrity value of a cable 255 between the first connector 256 and the second connector 257 is determined. The second signal integrity value will be different from the first signal integrity value due to a change in the cable layout and other factors that can degrade or improve the signal. In some implementations, the cable routing for determining the first signal integrity value includes three bends in the cable, and the cable routing for determining the second signal integrity value includes two bends in the cable.

In some implementations, the first PCBA 225 is mounted in a third position on the first reconfigurable mounting fixture 220. A second signal integrity value of the cable between the first connector 253 and the second connector 254 is determined. The second signal integrity value is different from the first signal integrity value due to the change of the mounting of the PCBA on the reconfigurable mounting fixture itself.

In some implementations, a third PCBA 245 is mounted in a third position on a third reconfigurable mounting fixture 240 mountable anywhere on the continuous top surface 215. The third reconfigurable mounting fixture 240 is mounted at a third location on the continuous top surface 215. The second PCBA 235 is connected to the third PCBA 245 with a second cable 258 routed on the base plate 210 between the second connector 260 for the second PCBA 235 and a third connector 259 for the third PCBA 245. A signal integrity value of the second cable 258 between the second connector 260 and the third connector 259 can then be determined by a technician.

In some implementations, one or more of the reconfigurable mounting fixtures are temporarily mounted to the continuous top surface with a sticky or tacky adhesive that allows the reconfigurable mounting fixture(s) to be easily removed and repositioned. In another aspect, one or more of the reconfigurable mounting fixtures each include a plurality of perforations arranged in a matrix on a rectangular-shaped mounting surface for receiving pins for mounting the PCBA to the reconfigurable mounting fixture(s). The perforations penetrate the respective mounting surfaces of the reconfigurable mounting fixtures.

While various aspects of the present invention have been described above, it should be understood that they have been presented by way of example only, and not limitation. Numerous changes to the disclosed aspects can be made in accordance with the disclosure herein without departing, from the spirit or scope. Thus, the breadth and scope of the present invention should not be limited by any of the above described aspects. Rather, the scope of the invention should be defined in accordance with the following claims and their equivalents.

Although the invention has been illustrated and described with respect to one or more implementations, equivalent alterations, and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. Furthermore, terms, such as those defined in commonly used dictionaries, should be interpreted as having a meaning that is consistent with their meaning in the context of the relevant art and will not be interpreted in an idealized or overly formal sense unless expressly so defined herein.

What is claimed is:

1. An apparatus simulating cable routing for determining signal integrity between electronic components within a computer chassis, the apparatus being outside of an actual computer chassis, the apparatus comprising:

a base plate simulating a computer chassis base, the base plate including a top surface;

a plurality of reconfigurable mounting fixtures each allowing temporary mounting of a printed circuit board assembly (PCBA) to a respective reconfigurable mounting fixture, the plurality of reconfigurable mounting fixtures temporarily mountable anywhere on the top surface of the base plate, each reconfigurable mounting fixture of the plurality of reconfigurable mounting fixtures having a rectangular-shaped mounting surface, a plurality of perforations being arranged on the rectangular-shaped mounting surface, the plurality of perforations being arranged in a matrix having several rows intersecting several columns, the matrix extending across the rectangular-shaped mounting surface in its entirety from one set of edges to respective opposing edges; and a cable including a first end connector allowing a connection to a first PCBA and a second end connector allowing a connection to a second PCBA.

2. The apparatus of claim 1, wherein the first PCBA is temporarily mounted to a first of the plurality of reconfigurable mounting fixtures, and the second PCBA is temporarily mounted to a second of the plurality of reconfigurable mounting fixtures, the temporary mounting occurring before the first PCBA and the second PCBA are mounted inside the computer chassis.

3. The apparatus of claim 1, wherein the plurality of perforations is configured for receiving removable pins for temporarily mounting the PCBA, the perforations penetrating the rectangular-shaped mounting surface.

4. The apparatus of claim 1, wherein at least one of the plurality of reconfigurable mounting fixtures comprises two distinct panels with one panel being mounted perpendicular to the other panel.

5. The apparatus of claim 4, wherein the other panel is mounted parallel to the top surface of the base plate.

6. The apparatus of claim 5, wherein the first PCBA is temporarily mounted to the other panel.

7. The apparatus of claim 4, wherein the two distinct panels include side walls, at least one of the side walls including a plurality of holes for receiving removable pins to mount the one panel to the other panel.

8. The apparatus of claim 1, wherein the plurality of reconfigurable mounting fixtures is temporarily mounted to the top surface with a sticky adhesive.

9. The apparatus of claim 1, wherein the base plate is a ferromagnetic metal, and wherein at least one of the reconfigurable mounting fixtures is temporarily mounted to the top surface by a magnetic attraction between the base plate and a metal portion on a bottom surface of the at least one reconfigurable mounting fixture.

10. The apparatus of claim 1, wherein the cable is a high-speed cable.

11. The apparatus of claim 1, wherein the cable is supported by the top surface and includes at least two bends between the first end connector and the second end connector.

* * * * *